US00RE36906E

United States Patent [19]

Franzen et al.

[11] E Patent Number: Re. 36,906

[45] Reissued Date of Patent: Oct. 10, 2000

[54] QUADRUPOLE ION TRAP WITH SWITCHABLE MULTIPOLE FRACTIONS

[75] Inventors: Jochen Franzen; Yang Wang, both of Bremen, Germany

[73] Assignee: Bruker Daltonik GmbH, Bremen, Germany

[21] Appl. No.: 08/975,058

[22] Filed: Nov. 20, 1997

Related U.S. Patent Documents

Reissue of:

[64] Patent No.: 5,468,958
Issued: Nov. 21, 1995
Appl. No.: 08/277,667
Filed: Jul. 20, 1994

[30] Foreign Application Priority Data

Jul. 20, 1993 [DE] Germany ..... 43 24 224

[51] Int. Cl.[7] ..... H01J 49/42

[52] U.S. Cl. ..... 250/292; 250/282; 250/291

[58] Field of Search ..... 250/292, 291, 250/290, 282

[56] References Cited

U.S. PATENT DOCUMENTS

| | | |
|---|---|---|
| 3,555,273 | 1/1971 | Arnold . |
| 4,882,484 | 11/1989 | Franzen et al. . |
| 4,975,577 | 12/1990 | Franzen et al. . |
| 5,028,777 | 7/1991 | Franzen et al. . |
| 5,170,054 | 12/1992 | Franzen . |
| 5,298,746 | 3/1994 | Franzen et al. . |
| 5,386,113 | 1/1995 | Franzen et al. . |

OTHER PUBLICATIONS

J. Franzen; Simulation Study of an Ion Cage with Superimposed Multipole Fields; International Journal of Mass Spectrometry and Ion Processes, 106 (1991) 63–78.

*Primary Examiner*—Kiet T. Nguyen

[57] ABSTRACT

An ion trap is provided in which higher multipole field fractions can be switched on and off and, in addition, can be electrically tuned. Specifically, the electrodes of an ideally shaped ion trap are divided into rotationally symmetrical component electrodes positioned facing the interior of the ion trap on a hyperboloidal surface with rotationally symmetry.

31 Claims, 3 Drawing Sheets

QUADRUPOLE ION TRAP WITH SWITCHABLE MULTIPOLE FRACTIONS

Matter enclosed in heavy brackets [ ] appears in the original patent but forms no part of this reissue specification; matter printed in italics indicates the additions made by reissue.

FIELD OF THE INVENTION

The invention relates to RF quadrupole ion traps.

BACKGROUND OF THE INVENTION

The various applications of RF quadrupole ion traps as single mass spectrometers, as tandem mass spectrometers for MS/MS examinations, as reaction vessels and measuring instruments for ionic molecule reactions, as a tool for the selective storage of ions with a uniform mass-to-charge ratio, and for the fragmentation of ions for examinations of their structure are known, for example from the standard work "Quadrupole Storage Mass Spectrometry" by R. E. March and R. J. Hughes, John Wiley & Sons, New York 1989.

Superposition of the quadrupole field of an RF quadrupole ion trap with higher multipole fields can have a favourable or adverse effect on operation, depending on the operating mode and operating phase of the ion trap.

Superposition of relatively weak, higher multipole fields of the same frequency on the RF quadrupole field has considerable effect on the stored ions if these ions stay, due to the amplitude of their secular oscillations, not only at the center of the quadrupole field but also in the noncentral regions of the ion trap. This can occur if (a) the ions are introduced into the ion trap from outside, if (b) the secular oscillation of the ions is excited by additional electrical fields (for example, with collision-induced fragmentation of the ions) or if (c) the ions are mass-selectively ejected from the trap for analysis.

The generation of quadrupole fields with superposed weak multipole fields of even ordinal numbers by the special shape of the electrodes is known from U.S. Pat. No. 5,028,777. Superposition with weak hexapole and octopole fields is described in U.S. Pat. No. 5,170,054.

Higher multipole fields with an even ordinal number (octopole fields, dodecapole fields) stabilize the storage of ions against interference fields, the frequency of which is in resonance with the secular oscillation (J. Franzen, Int. J. Mass Spectrom. Ion Proc., 106 (1991) 63). The interference fields can be generated by interference frequencies on the storage RF voltage, by interference frequencies on other electrodes, or also by nonlinear resonance conditions originating from the chance or desired deviation in the shape of the electrodes. If resonance with an interference frequency arises, the ion oscillation absorbs energy and the oscillation amplitude increases. The multipole fields cause a change in the secular oscillation frequency of the ions with growing oscillation amplitude. As a result, on enlargement of their oscillation due to resonant energy absorption, ions quickly fall out of step with the exciting interference frequency, and thus fall out of resonance. Further absorption of energy does not take place. In contrast to a pure quadrupole field, there is consequently a distinct voltage threshold for the removal of ions from the trap in the case of multipole field superposition.

One use of ion traps in mass spectrometric measurement is based on the mass selective ejection of ions from the trap.

There are different resonance phenomena which can be used for this: resonance at the edge of the stable storage area (U.S. Pat. No. 4,548,884), resonance with an electrically generated dipole field (U.S. Re 34 000), and resonance with a nonlinear resonance condition by superposition with higher multipole fields (EP 0 383 961 A1). In all cases, ejection enables the ions of successive masses (mass-to-charge ratios to be more precise) to be sequentially detected outside the ion trap with an ion detector and measured as an ion stream. Even multipole fields can favourably influence this mass selective ejection of ions from ion traps by increasing the mass resolving power. Here too, the multipole-generated dependence of the oscillation frequency on the amplitude plays a role. Enlargement of the amplitude on convergence with the resonance condition for ion ejection enables the oscillation frequency to be changed in such a way that resonance is reached more quickly and the absorption of energy for amplitude enlargement is intensified.

Uneven higher multipole fields (hexapole fields, decapole fields), which are superposed in addition to the even multipole fields, can again improve mass selective ion ejection by determining the direction of ejection in such a way that the ions always leave the trap through the same end cap. The other end cap is not even reached by the oscillating ions.

The superposed multipole fields are, however, disadvantageous for mass selective storage of ions in the ion trap. For this type of storage, all undesired ions are prevented from storage by a mixture of alternating voltages with differing frequencies which is additionally applied to the electrodes. The secular frequencies of the undesired ions are constantly excited, causing them soon to leave the ion trap. The frequency mixture does not, however, include the frequency for excitation of the desired ion type, enabling it to be caught and stored in the ion trap by being slowed down in a collision gas. The simultaneous storage of more than one type of ion is also possible by leaving more than one gap in the frequency mixture. These can be ions which are generated outside the ion trap and introduced into it by ion-optical means or, however, ions which are generated within the ion trap by any particular type of ionization process. Patent application DE-P 43 16 737.3 describes one particular digital generation method for the frequency mixture, which is used for selective ion storage, as well as quoting further literature.

This type of mass selective storage of ions by one or more frequency gaps in an applied frequency mixture requires, however, that the ions have a secular oscillation frequency which is independent of their oscillation amplitude. The ions can only then be stored with good mass resolution if their oscillation frequency is independent of the oscillation amplitude since only then are they spared excitation by the frequency mixture in the narrow frequency gap. The oscillation frequency is, however, independent of the oscillation amplitude only in a pure quadrupole field. Consequently, selective storage of individual ion types with good mass resolution is possible only in a pure quadrupole field.

So far only arrangements for ion traps have been described which generate either a relatively pure quadrupole field or, a more or less intense superposition of a quadrupole field with higher multipole fields. The type of field is predetermined by a fixed electrode structure. Narrow correcting rings between the end cap electrodes on the one hand and ring electrodes on the other serve only for correction of the quadrupole field.

Therefore, it is among the objects of the invention to produce an RF quadrupole ion trap, which on the one hand is able selectively to store selected ions with good mass resolution, and on the other hand to store ions in a stable manner and eject them selectively with good mass resolution.

SUMMARY OF THE INVENTION

In accordance with the invention, there is provided an RF quadrupole ion trap, having electrodes adapted for generating a quadrupole storage field, and an RF source for applying a first RF voltage to the electrodes for generating the quadrupole field, wherein one or more of the electrodes is constituted by a plurality of component electrodes, each of the component electrodes being mutually electrically insulated from each other, and the component electrodes being positioned facing the interior of the ion trap on a hyperboloidal surface with rotational symmetry, the arrangement being such as to permit the application to the ion trap by means of the component electrodes of at least one higher multipole field superposed on the quadrupole field, and wherein the apparatus also includes means for applying a second RF voltage to the component electrodes having the same frequency as the first RF voltage, for generating a higher multipole field, and wherein the apparatus also includes switching means for enabling selective activation and deactivation of the higher multipole field during operation of the ion trap.

In accordance with a further aspect of the invention, there is provided a method of operating an RF quadrupole ion trap, which method comprises containing ions within a trap having electrodes adapted for generating a quadrupole storage field, wherein at least one of the electrodes is constituted by a plurality of mutually electrically insulated component electrodes, and selectively i) short circuiting the component electrodes such that they are equivalent to a single electrode, and ii) applying to the component electrodes an RF voltage to generate a higher multipole field.

The ion trap in accordance with the invention enables the higher multipole field fractions to be switched on and off and, preferably to be electrically tuned in order to generate optimum superposition with multipole fields for each operation or each operating phase.

The ion trap according to the invention can be operated, on the one hand, with as ideal a quadrupole field as possible and, on the other, with defined superposed higher multipole fields. It is possible to switch over the various operating states quickly, without the stored ions being greatly disturbed The ion trap of the invention effectively comprises more than the three electrodes (one ring and two end cap electrodes), normally used in a quadrupole ion trap with corresponding electrical wiring for the optional connection of the higher multipole fields. In particular, a form of the electrodes, in which the hyperbolically shaped end cap or ring electrodes of an ideally shaped Paul trap are divided into rotationally symmetric component electrodes, can, in addition to a state with a virtually ideally pure quadrupole field, also generate superpositions with even or odd higher multipole fields. A pure quadrupole field and quadrupole field with superposed multipole fields can be generated at the component electrodes by switching between different component voltages of the same RF voltage.

Since the three dimensional, rotationally symmetrical multipole fields represent an orthogonal quantity in a mathematical sense, all rotationally symmetrical fields can be shown as a superposition of multipole fields. The superpositions consist of a dipole field, quadrupole field, hexapole field, octopole field, decapole field, dodecapole field and so on. The axis of rotation, the so-called z-axis, is common to all fields in the superposition.

The electrodes of an ion trap can be shaped in such a way as to generate a relatively pure quadrupole field, i.e. a quadrupole field without other superposed multipole fields, in the interior on applying the RF voltage between the ring electrode on the one hand and the end cap electrodes on the other (Paul and Steinwedel, U.S. Pat. No. 2,939,952). The quadrupole field is only "relatively pure" since the generation of an ideally pure quadrupole field is not completely possible due to the fringing fields which are always present as a result of the finite size of the electrode structure. The quality of the quadrupole field is, however, sufficient for most operational purposes.

In accordance with the invention one or more of the electrodes of such a rotationally symmetrical electrode structure for generating a quadrupole field may be divided into rotationally symmetrical component electrodes such that the component electrodes may be supplied separately with voltages. Tuning of the RF voltages applied enables the remaining rotationally symmetric field errors of the ion trap to be compensated for in a first approximation as well as specifically odd and even higher-order multipole fields to be superposed.

BRIEF DESCRIPTION OF THE DRAWINGS

A number of preferred embodiments of the invention will now be explained in more detail with reference to the accompanying drawings, in which.

DETAILED DESCRIPTION OF THE ILLUSTRATIVE EMBODIMENTS

Figure 1:
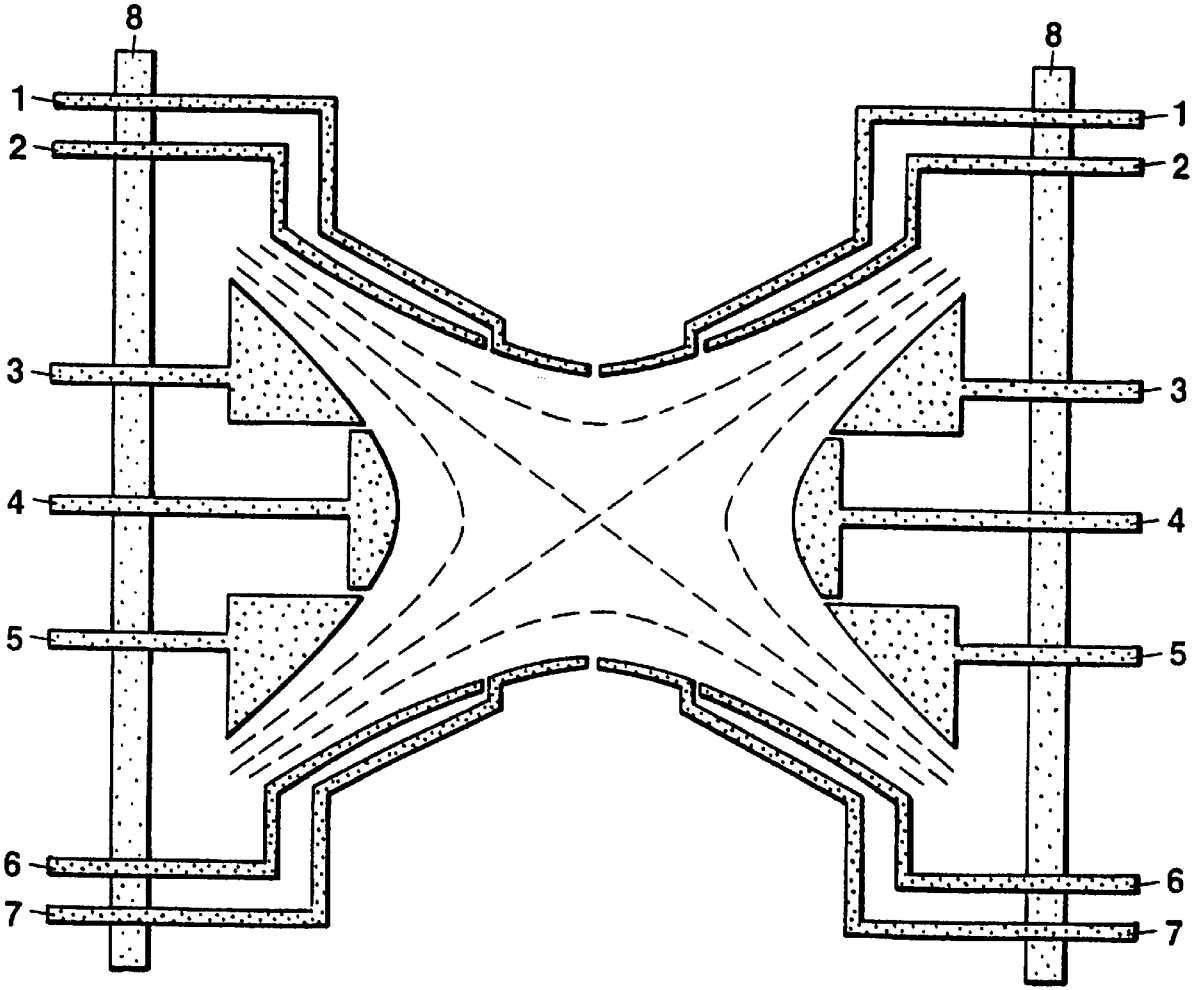
FIG. 1 shows a schematic sketch of a rotationally hyperbolic electrode structure.

Referring first to FIG. 1, a rotationally hyperbolic electrode structure comprises end caps and ring electrodes which are supported by insulating carriers (8). The upper end cap is divided into two component electrodes (1) and (2) and the lower end cap into component electrodes (6) and (7). The ring electrode is divided into component electrodes (3), (4), and (5). If component electrodes (1), (2), (6), and (7) are electroconductively connected, as well as component electrodes (3), (4), and (5), a relatively pure quadrupole field can be generated by applying a voltage between the two electrode groups. The potential profile of the quadrupole field is indicated with broken lines.

If, however, the component electrodes are electrically isolated and receive different voltages, the rotationally symmetric field in the interior can be changed relatively variably. In the mathematical and physical sense, a change of this kind always corresponds to superposition of the quadrupole field with multipole fields.

Figure 2:
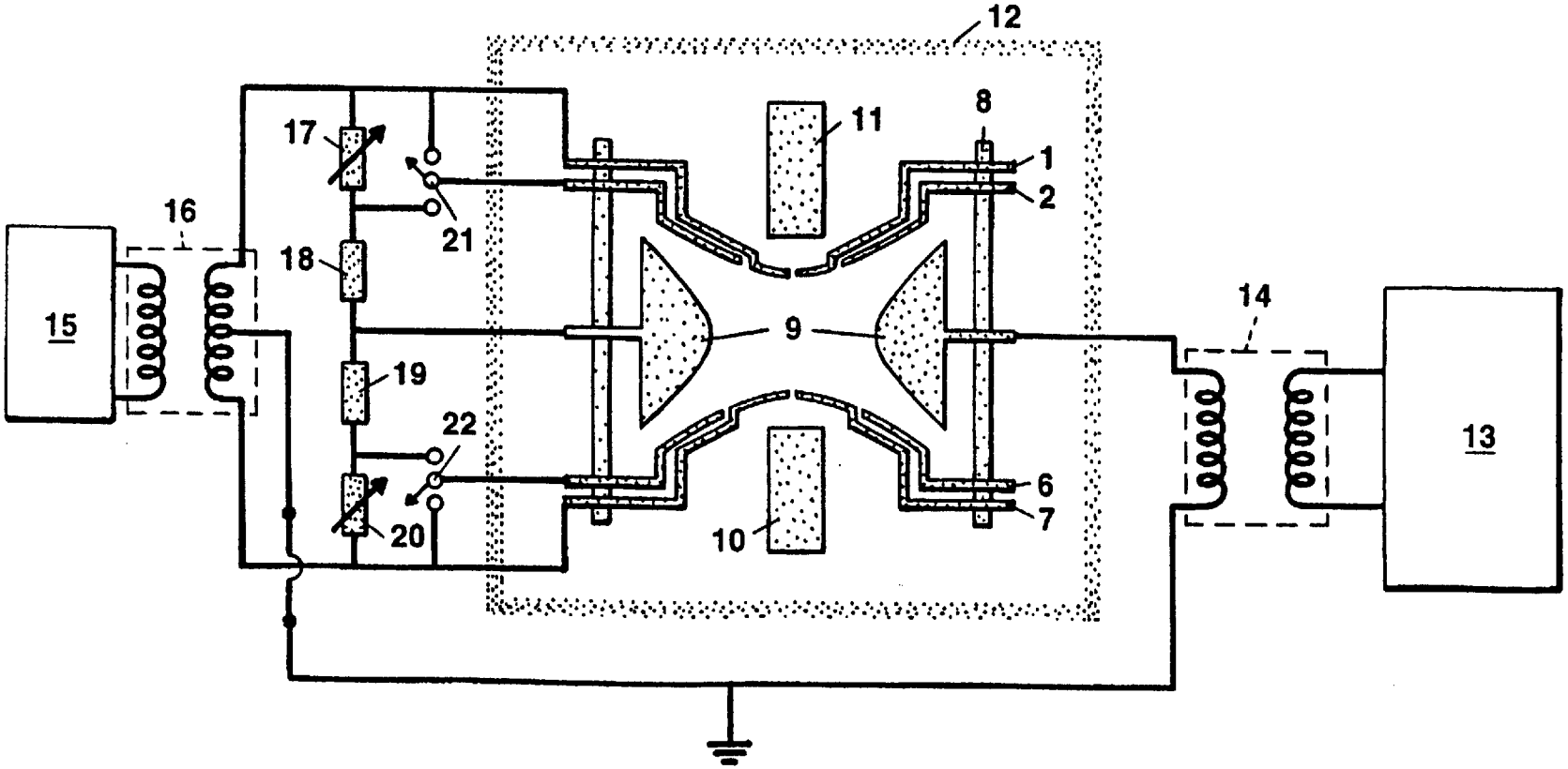
FIG. 2 shows a mixed schematic and circuit diagram of a particular embodiment of the invention, in which only the end cap electrodes are divided into component electrodes.

FIG. 2 shows a mixed schematic and circuit diagram of a particular embodiment of the invention, in which only the end cap electrodes are divided into component electrodes (1), (2), (6) and (7). The hyperboloid ring or toroidal electrode (9) is not divided. This embodiment is particularly interesting since the end cap electrodes divided in this manner are able to generate relatively pure superpositions with weak hexapole and octopole fields.

The ion generator (10) can be both an externally fitted ion source, enabling low-energy ions to be shot into the ion trap, and an electron source for shooting electrons into the ion trap for internal ion generation. On leaving the ion trap through one or more perforations in component electrode (1) as a result of special measures, they can be detected by the ion detector (11) and measured as an ion current. The ion trap is located in a vacuum system (12) with a pump system which is not shown here. FIG. 2 also lacks the necessary admission systems for analysis and collision gases, which can be fitted in the conventional manner.

For reasons of cost and simplification, the wiring of the ion trap has been chosen so that there is only a single generator (13) for the storage RF voltage. The secondary RF voltage is generated via the transformer (14) and is applied between component electrodes (1) and (7) on the one hand and the ring electrode (9) on the other. A second generator (15) generates any individual or mixed frequencies via the transformer (16), which are able to have a dipolar effect in the z-direction on the stored ions via component electrodes (1) and (7). This enables the secular frequencies of the ions oscillating in the ion trap to be excited in the z-direction in the manner required for the various operational purposes. Amongst others, these operational purposes include selective storage, the isolation of certain ion types, collision-induced fragmentation, and mass selective ion ejection.

The primary RF voltage is divided by two adjustable voltage dividers (17), (18) and (19), (20). The two switches (21) and (22) enable component electrodes (2) and (6) to be connected either to the component voltages of the voltage dividers or, however, to the voltages of component electrodes (1) or (7). In the latter instance, the relatively pure quadrupole field is generated. If voltages, which differ only slightly from the voltages of component electrodes (1) and (7), are applied, weak multipole fields are superposed. If the voltages are symmetric, the result is even multipole fields, particularly the octopole field. Asymmetric setting of the voltages results in additional odd multipole fields, above all the hexapole field. It must be particularly emphasized at this point that the voltage dividers, which are shown here symbolically as potentiometer-type resistors, can also be other types of divider. Capacitor voltage dividers are particularly interesting in this regard. The component electrodes are automatically supplied with a high voltage of the same frequency by the voltage dividers. If, in addition, the phases of the RF voltages are also to be the same, extra wiring may be necessary.

FIG. 2 thus shows an arrangement with which both operation with a practically pure quadrupole field is possible and, by reversing switches (21) and (22), operation with superposed multipole fields. Depending on the setting of the voltage dividers, the intensity of the superposed multipole fields, as well as the mixture of even and odd multipole fields, can be adjusted.

Figure 3:
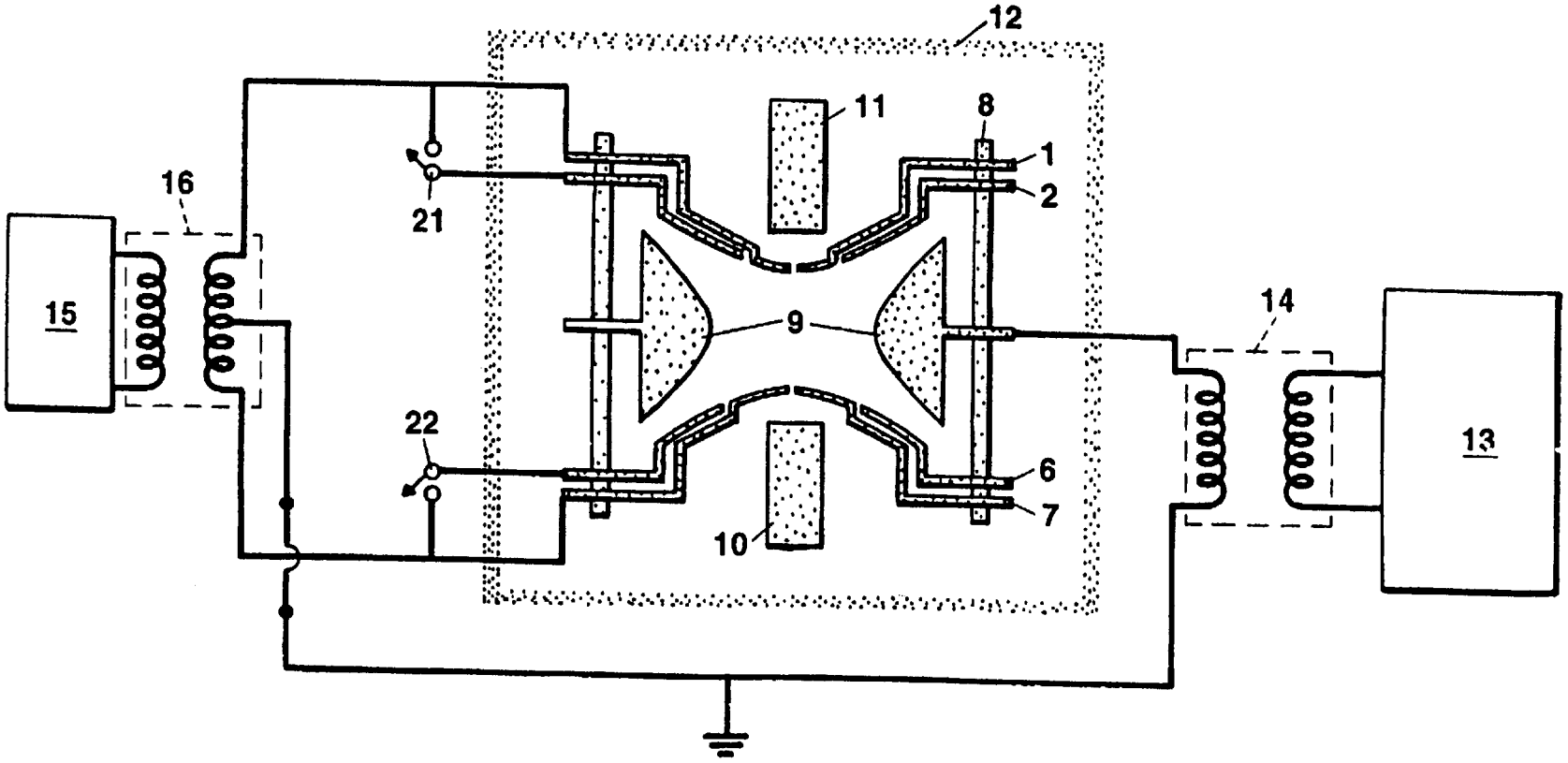
FIG. 3 shows an alternative and very simple arrangement, in which adjustment of the intensity or mixture of the multipole fields to be additionally superposed is no longer possible after single optimization.

FIG. 3 shows a very simple arrangement, in which adjustment of the intensity or mixture of the multipole fields to be additionally superposed is no longer possible after single optimization. With switches (21) and (22) closed, the practically pure quadrupole field is again generated. If the switches are opened, a capacitor voltage divider results automatically for component electrodes (2) and (6) each. The divider for component electrode (2) comprises the electrical capacity of the mechanical arrangement between electrodes (2) and (9) and the capacity between component electrodes (2) and (1). The same applies for component electrode (6). In this instance, the hexapole fraction is generated by a different division of the two end caps into component electrodes of varying sizes, an arrangement which is asymmetric with regard to the area z=0. Further tuning can be achieved by additionally fitted capacitors. This example in FIG. 3 shows that connectable multipole fields can be generated in a very simple manner. Apart from division of the end caps, only two additional switches are necessary. The switches can also be located within the vacuum system.

In addition to the embodiments in FIGS. 2 and 3, there are further embodiments offering certain advantages.

By dividing each of the end cap electrodes into three component electrodes, to which correspondingly graded RF voltages are applied, additional hexapole and octopole fields with relatively low fractions of still higher multipole fields can be generated. The same applies for a finer division of the ring electrode.

Ion traps can be built which permit the setting of several superposition states with multipole fields by multiple switching. Thus, in addition to superposition with even multipole fields, superpositions with hybrid forms comprising even and odd multipole fields can also be generated. The basic quadrupole state and more than one of these superposition states can be switched on together.

The remaining rotationally symmetric field errors of the hyperboloid electrode structure (defined as deviations from the pure quadrupole field) can be largely compensated for by RF voltages suitably applied to the component electrodes.

Another kind of operation is also possible which switches only between different superposition states of higher multipole fields, without using the pure quadrupole field.

Here, a particularly favourable operating mode for operation as a mass spectrometer is described, an ion trap as per FIG. 2 being used. This manner of operation applies, for example, to external generation of an ion mixture in the ion source (10), in which, however, only one ion type is to undergo an MS/MS analysis of the daughter ions. This kind of operation is, again by way of example, suitable for the amino-acid sequence analysis of a selected protein or peptide which can be very conveniently prepared from a daughter-ion spectrum.

A mixture of peptides can be ionized by different methods, for instance by "matrix-assisted laser desorption/ionization" (frequently abbreviated to "MALDI"), by "electrospraying", or by secondary ion mass spectrometry (SIMS) on a liquid surface. A single type of given mass is now to be stored from the mixture of peptide ions. Other peptides with very little difference in mass may also be present. A good mass resolving power is therefore required for selective storage.

Selective storage of the peptide ions selected is generated by a correspondingly calculated frequency mixture which is created in the generator (15) and applied to the two end caps, generating an essentially dipolar field with the mixture of alternating frequencies. The frequency mixture contains a gap where the secular oscillation frequency of the selected peptide ions is located in the z-direction. As a result, after being shot into the ion trap, these peptide ions are stored by being slowed down in the trap's collision gas while the peptide ions of other masses are not stored since their secular oscillation frequencies are constantly excited until they are destroyed by colliding with the electrodes or until they leave the trap. To increase mass resolving power during the storage process, all superpositions with higher multipole fields are switched off in the manner described above with switches (21) and (22).

After the ionization phase the further generation or introduction of ions is stopped. The ions stored must now be fragmented. Their secular oscillation must therefore be excited to supply them with sufficient kinetic energy for fragmenting collisions with the residual gas. With this aim in view, the generator (15) for the dipolar excitation frequency is now switched over so that only the frequency for excitation of the secular frequency of the ions stored is generated.

In a pure quadrupole field, however, excitation of this kind is difficult: the ions continuously absorb energy until they collide with the electrodes. They are then lost for the further process.

Due to the connecting of an even multipole field of higher order, the fragmentation process can, however, be very favourably arranged. The ions are then able to absorb only a certain amount of kinetic energy. On enlargement of their oscillation amplitude, they then fall out of resonance with the dipole field applied due to the change in their oscillation frequency by the superposed multipole field, resulting in a clear upper limit for their oscillation amplitude. This can be used for fragmentation by generating a maximum oscillation amplitude by the choice of dipole voltage so that the ions just fail to collide with the end caps.

After fragmentation, the mixture of the resulting daughter ions must be analyzed with a mass spectrometer. A particularly favourable and fast method can be used for this which is based on the actually known utilization of the nonlinear hexapole resonance at $\beta_z=2/3$, supported by a dipole field with the frequency $f=\Omega/3$ ($\Omega$ being the frequency of the storage field), which is electrically generated with the generator (15). The necessary superposition with a hexapole field can in turn be generated by the invention, in this case by an asymmetric setting of switches (21) and (22).

The foregoing description has been limited to specific embodiments of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. An RF quadrupole ion trap comprising:

electrodes adapted for generating a quadrupole storage field, and an RF source [for applying] *that generates* a first RF voltage *that is applied* to the electrodes for generating the quadrupole field, wherein at least one of the electrodes comprises a plurality of component electrodes, each of the component electrodes being mutually electrically insulated from each other, and the component electrodes being positioned facing the interior of the ion trap on a [hyperboloidal] surface with rotational symmetry, such as to permit the application to the ion trap by means of the component electrodes of at least one higher multiple field superposed on the quadrupole field; *and*

[means for applying] a second RF voltage *that may be applied* to the component electrodes having the same frequency as the first RF voltage, for generating the at least one higher multiple field[; and switching means for enabling selective activation and deactivation of the at least one higher multiple field during operation of the ion trap].

2. An ion trap as claimed in claim 1, wherein the [RF source and the means for applying a second RF voltage are phase-synchronized such that the] first and second RF voltages have the same phase.

3. An ion trap as claimed in claim 1, wherein means are provided for applying, in addition to said first and second RF voltages further alternating voltages of other frequencies for exciting secular oscillations of ions stored in the ion trap.

4. An ion trap as claimed in claim 1, having a single RF generator for generating said first and second RF voltages.

5. An ion trap as claimed in claim 4, including at least one voltage divider for generation of the quadrupole field and any additional higher multipole fields.

6. An ion trap as claimed in claim 5, wherein the at least one voltage divider is a potentiometer-type resistor.

7. An ion trap as claimed in claim 5, wherein the at least one voltage divider is a capacitor voltage divider.

8. An ion trap as claimed in claim 7, wherein at least a part of the electrical capacitance of the capacitor voltage divider is accounted for by electrical capacitance between electrodes of the ion trap.

9. An ion trap as claimed in claim 1, including means for modifying at least one of the RF voltages for generation of the additional higher multipole fields.

10. An ion trap as claimed in claim 9, including means for short-circuiting the component electrodes, for generating a simple quadrupole field.

11. An ion trap as claimed in claim 5, including means for modifying at least one of the RF voltages for generation of the quadrupole field and of additional higher multipole fields between two component voltages of the respective voltage divider.

12. An ion trap as claimed in claim 1, including a plurality of switches for switching over the first and second RF voltages to several different component voltages.

13. A method of operating an RF quadrupole ion trap, which method comprises:

containing ions within an RF quadrupole ion trap having electrodes adapted for generating a quadrupole storage field, and an RF source [for applying] *that generates* a first RF voltage *that is applied* to the electrodes for generating the quadrupole field, wherein one or more of the electrodes is constituted by a plurality of component electrodes, each of the component electrodes being mutually electrically insulated from one another, and the component electrodes being positioned facing the interior of the ion trap on a [hyperboloidal] surface with rotational symmetry, such as to permit the application to the ion trap by means of the component electrodes of at least one higher multiple field superposed on the quadrupole field; *and* applying a second RF voltage to the component electrodes having the same frequency as the first RF voltage, for generating the at least one higher multiple field[; and enabling, with switching means, selective activation and deactivation of the at least one higher multiple field during operation of the ion trap and selectively i) short circuiting the component electrodes such that they are equivalent to a single electrode, and ii) applying to the component electrodes an RF voltage to generate a higher multiple field].

*14. An ion trap as claimed in claim 1 wherein the inner surface is hyperboloidal.*

*15. An ion trap as claimed in claim 1 further comprising a switching apparatus that allows selective activation and deactivation of the at least one higher multiple field during operation of the trap.*

*16. A method as claimed in claim 13 further comprising, as part of containing ions within an RF quadrupole ion trap, using a hyperboloidal surface for said surface with rotational symmetry.*

*17. A method as claimed in claim 13 further comprising selectively activating and deactivating the at least one higher multiple field during operation of the ion trap.*

*18. A method as claimed in claim 17 wherein selectively activating and deactivating the at least one higher multiple field comprises selectively:*

*i) short circuiting the component electrodes such that they are equivalent to a single electrode; and*

*ii) applying to the component electrodes an RF voltage to generate a higher multiple field.*

*19. An RP quadrupole ion trap comprising:*

*electrodes adapted for generating a quadrupole storage field, and an RF source for applying a first RF voltage to the electrodes for generating the quadrupole field, wherein at least one of the electrodes comprises a plurality of component electrodes, each of the component electrodes being mutually electrically insulated from each other, and the component electrodes being positioned facing the interior of the ion trap on a hyperboloidal surface with rotational symmetry, such as to permit the application to the ion trap by means of the component electrodes of at least one higher multipole field superposed on the quadrupole field;*

*means for applying a second RF voltage to the component electrodes having the same frequency as the first RF voltage, for generating the at least one higher multipole field; and*

*switching means for enabling selective activation and deactivation of the at least one higher multipole field during operation of the ion trap.*

*20. An ion trap as claimed in claim 19, wherein the RF source and the means for applying a second RF voltage are phase-synchronized such that the first and second RF voltages have the same phase.*

*21. An ion trap as claimed in claim 19, wherein means are provided for applying, in addition to said first and second RF voltages further alternating voltages of other frequencies for exciting secular oscillations of ions stored in the ion trap.*

*22. An ion trap as claimed in claim 19, having a single RF generator for generating said first and second RF voltages.*

*23. An ion trap as claimed in claim 22, including at least one voltage divider for generation of the quadrupole field and any additional higher multipole fields.*

*24. An ion trap as claimed in claim 23, wherein the at least one voltage divider is a potentiometer-type resistor.*

*25. An ion trap as claimed in claim 23, wherein the at least one voltage divider is a capacitor voltage divider.*

*26. An ion trap as claimed in claim 25, wherein at least a part of the electrical capacitance of the capacitor voltage divider is accounted for by electrical capacitance between electrodes of the ion trap.*

*27. An ion trap as claimed in claim 23, including means for modifying at least one of the RF voltages for generation of the quadrupole field and of additional higher multipole fields between two component voltages of the respective voltage divider.*

*28. An ion trap as claimed in claim 19, including means for modifying at least one of the RF voltages for generation of the additional higher multipole fields.*

*29. An ion trap as claimed in claim 28, including means for short-circuiting the component electrodes, for generating a simple quadrupole field.*

*30. An ion trap as claimed in claim 19, including a plurality of switches for switching over the first and second RF voltages to several different component voltages.*

*31. A method of operating an RF quadrupole ion trap, which method comprises:*

*containing ions within an RF quadrupole ion trap having electrodes adapted for generating a quadrupole storage field, and an RF source for applying a first RF voltage to the electrodes for generating the quadrupole field, wherein one or more of the electrodes is constituted by a plurality of component electrodes, each of the component electrodes being mutually electrically insulated from one another, and the component electrodes being positioned facing the interior of the ion trap on a hyperboloidal surface with rotational symmetry, such as permit the application to the ion trap by means of the component electrodes of at least one higher multipole field superposed on the quadrupole field;*

*applying a second RF voltage to the component electrodes having the same frequency as the first RF voltage, for generating the at least one higher multipole field; and*

*enabling, with switching means, selective activation and deactivation of the at least one higher multipole field during operation of the ion trap and selectively*

*i) short circuiting the component electrodes such that they are equivalent to a single electrode, and*

*ii) applying to the component electrodes an RF voltage to generate a higher multiple field.*

* * * * *